US012067919B2

(12) United States Patent
Imayoshi

(10) Patent No.: US 12,067,919 B2
(45) Date of Patent: Aug. 20, 2024

(54) DISPLAY DEVICE AND SOURCE DRIVER

(71) Applicant: LAPIS Technology Co., Ltd., Yokohama (JP)

(72) Inventor: Takahiro Imayoshi, Yokohama (JP)

(73) Assignee: LAPIS TECHNOLOGY CO., LTD., Yokohama (JP)

( * ) Notice: Subject to any disclaimer, the term of this patent is extended or adjusted under 35 U.S.C. 154(b) by 0 days.

(21) Appl. No.: 18/470,010

(22) Filed: Sep. 19, 2023

(65) Prior Publication Data

US 2024/0112607 A1 Apr. 4, 2024

(30) Foreign Application Priority Data

Sep. 30, 2022 (JP) ................................ 2022-158180

(51) Int. Cl.
*G09G 3/20* (2006.01)

(52) U.S. Cl.
CPC ....... *G09G 3/20* (2013.01); *G09G 2310/0275* (2013.01); *G09G 2310/0291* (2013.01); *G09G 2310/08* (2013.01)

(58) Field of Classification Search
CPC ............. G09G 3/20; G09G 2310/0275; G09G 2310/0291; G09G 2310/08
See application file for complete search history.

(56) References Cited

U.S. PATENT DOCUMENTS

2009/0027318 A1* 1/2009 Murakami ............... G09G 3/20 345/87
2016/0163264 A1* 6/2016 Nishimura ........... G09G 3/3266 345/212
2020/0035193 A1* 1/2020 Seong .................... G09G 5/003

FOREIGN PATENT DOCUMENTS

JP 2004301946 A 10/2004
JP 2008107655 A 5/2008

* cited by examiner

*Primary Examiner* — Antonio Xavier
(74) *Attorney, Agent, or Firm* — Rabin & Berdo, P.C.

(57) ABSTRACT

A display device includes drivers and a selector that supplies gradation voltage signals to data lines selectively. The source drivers include a first source driver having a first output buffer outputting a switch signal and a second driver having a second output buffer. The first output buffer has first and second transistors connected via an output terminal outputting the switch signal and turned on and off in a complementary manner. The second output buffer has third and fourth transistors connected via an output terminal outputting the switch signal and turned on and off in a complementary manner. The output terminals of the first and second output buffers are electrically connected. The first source driver has a buffer control circuit that controls a voltage to be applied to each transistor in order to create a high-impedance period where the first and second transistors are turned off at the same time.

4 Claims, 5 Drawing Sheets

DISPLAY DEVICE AND SOURCE DRIVER

CROSS REFERENCE TO RELATED APPLICATION

This application is based upon and claims the benefit of priority of the prior Japanese Patent Application No. 2022-158180, filed on Sep. 30, 2022, the entire contents of which are incorporated herein by reference.

TECHNICAL FIELD

The disclosure relates to a display device and a source driver.

BACKGROUND ART

In recent years, display panels used in display devices have been increasingly wider, and because of this trend, it is becoming more common for a source driver to have a plurality of driver integrated circuits (ICs). The plurality of driver ICs are arranged along the extending direction of the gate lines, and adjacent driver ICs are respectively cascade-connected, for example (see Japanese Patent Application Laid-open Publication No. 2004-301946, for example).

In addition, a display device is proposed in which the time-division driving is performed on data lines so that an output amplifier in each driver IC can drive a plurality of data lines, making it possible to keep the chip size as small as possible (see Japanese Patent Application Laid-open Publication No. 2008-107655, for example).

SUMMARY

In a display device that performs the time-division driving of data lines, a multiplex selector provided between a source driver and a display panel sequentially switches data lines to be driven based on a select signal supplied from the source driver. When the source driver is constituted of a plurality of driver ICs, the driver ICs located at both ends of the plurality of driver ICs arranged along the extending direction of the gate lines (hereinafter referred to as the leftmost driver IC and the rightmost driver IC) provide select signals to the multiplex selector, respectively.

A buffer for outputting the select signal is constituted of a P-channel MOS transistor (hereinafter referred to as PMOS) and an N-channel MOS transistor (hereinafter referred to as NMOS) having the respective drains connected to each other for complementary operation, for example. The output of the buffer of the leftmost driver IC and the output of the buffer of the rightmost driver IC are connected to each other through the multiplex selector, and are short-circuited on the panel.

In the respective buffers of the leftmost driver IC and the rightmost driver IC, the PMOS and the NMOS are ideally turned on and off in a complementary manner at the same time. However, due to a signal delay of a video signal supplied to the respective driver ICs and the like, the operation timing of each buffer might not coincide with each other. Due to this time lag, a through current might be generated between the output of the buffer of the leftmost driver IC and the output of the buffer of the rightmost driver IC.

For example, if the timing at which the PMOS in the buffer of the leftmost driver IC is turned on does not coincide with the timing at which the PMOS in the buffer of the rightmost driver IC is turned on, the PMOS in the leftmost driver IC might be turned on while the NMOS in the rightmost driver IC is on, which causes a through current to be generated between the respective buffers. Similarly, the PMOS in the rightmost driver IC might be turned on while the NMOS in the leftmost driver IC is on, which causes a through current to be generated between the respective buffers.

As described above, the difference in the operation timings of the respective buffers in the driver ICs located at both ends causes a problem of generating a through current between those buffers. Also, the generation of through current can lead to a problem of EMI (electromagnetic interference) noise.

The disclosure was made in view of the above problems, and aims at providing a display device that can perform the time-division driving on data lines based on a select signal from a source driver constituted of a plurality of driver ICs while suppressing the generation of a through current.

A display device of the disclosure includes: a display having a plurality of data lines and a plurality of gate lines, and a plurality of pixel sections disposed at respective intersections of the plurality of data lines and the plurality of gate lines in a matrix; an n-number of source drivers (n is an integer of 2 or greater) each outputting a gradation voltage signal to two or more data lines out of the plurality of data lines based on a video data signal; and a selector that receives a switching signal and supplies the gradation voltage signal outputted from each of the n-number of source drivers to the two or more data lines selectively based on the switching signal, wherein the n-number of source drivers include a first source driver that has a first output buffer outputting the switching signal and a n-th source driver that has a second output buffer outputting the switching signal, wherein the first output buffer includes a first transistor and a second transistor that are connected in parallel via a first node that is an output terminal outputting the switching signal, the first and second transistors being turned on and off by receiving a voltage at respective control terminals thereof, wherein the second output buffer includes a third transistor and a fourth transistor that are connected in parallel via a second node that is an output terminal outputting the switching signal, the third and fourth transistors being turned on and off in a complementary manner by receiving a voltage at respective control terminals thereof, wherein the first output buffer and the second output buffer have the respective output terminals electrically connected to each other, and wherein the first source driver includes a buffer control circuit that controls a voltage applied to the control terminals of the first transistor and the second transistor to create a high-impedance period in which the first transistor and the second transistor are turned off at the same time.

A source driver according to the disclosure is a source driver connected to a display panel having a plurality of data lines, a plurality of gate lines, and a plurality of pixel sections disposed at respective intersections of the plurality of data lines and the plurality of gate lines in a matrix, and outputting a gradation voltage based on a video data signal, the source driver including: an n-number of driver ICs (n is an integer of 2 or greater) connected to a selector that supplies the gradation voltage signal outputted from each of the source drivers to the two or more data lines selectively based on a switching signal, the n-number of driver ICs each outputting the gradation voltage signal, wherein the n-number of driver ICs include a first driver IC that has a first output buffer outputting the switching signal and an n-th driver IC that has a second output buffer outputting the switching signal, wherein the first output buffer includes a first transistor and a second transistor that are connected in parallel via a first node that is an output terminal outputting the switching signal, the first and second transistors being turned on and off by receiving a voltage at respective control terminals thereof, wherein the second output buffer includes a third transistor and a fourth transistor that are connected in parallel via a second node that is an output terminal outputting the switching signal, the third and fourth transistors being turned on and off in a complementary manner by receiving a voltage at respective control terminals thereof, wherein the first output buffer and the second output buffer have the respective output terminals electrically connected to each other, and wherein the first driver IC includes a control circuit that controls a voltage applied to the control terminals of the first transistor and the second transistor to create a high-impedance period in which the first transistor and the second transistor are turned off at the same time.

DETAILED DESCRIPTION OF EMBODIMENTS

Figure 1:
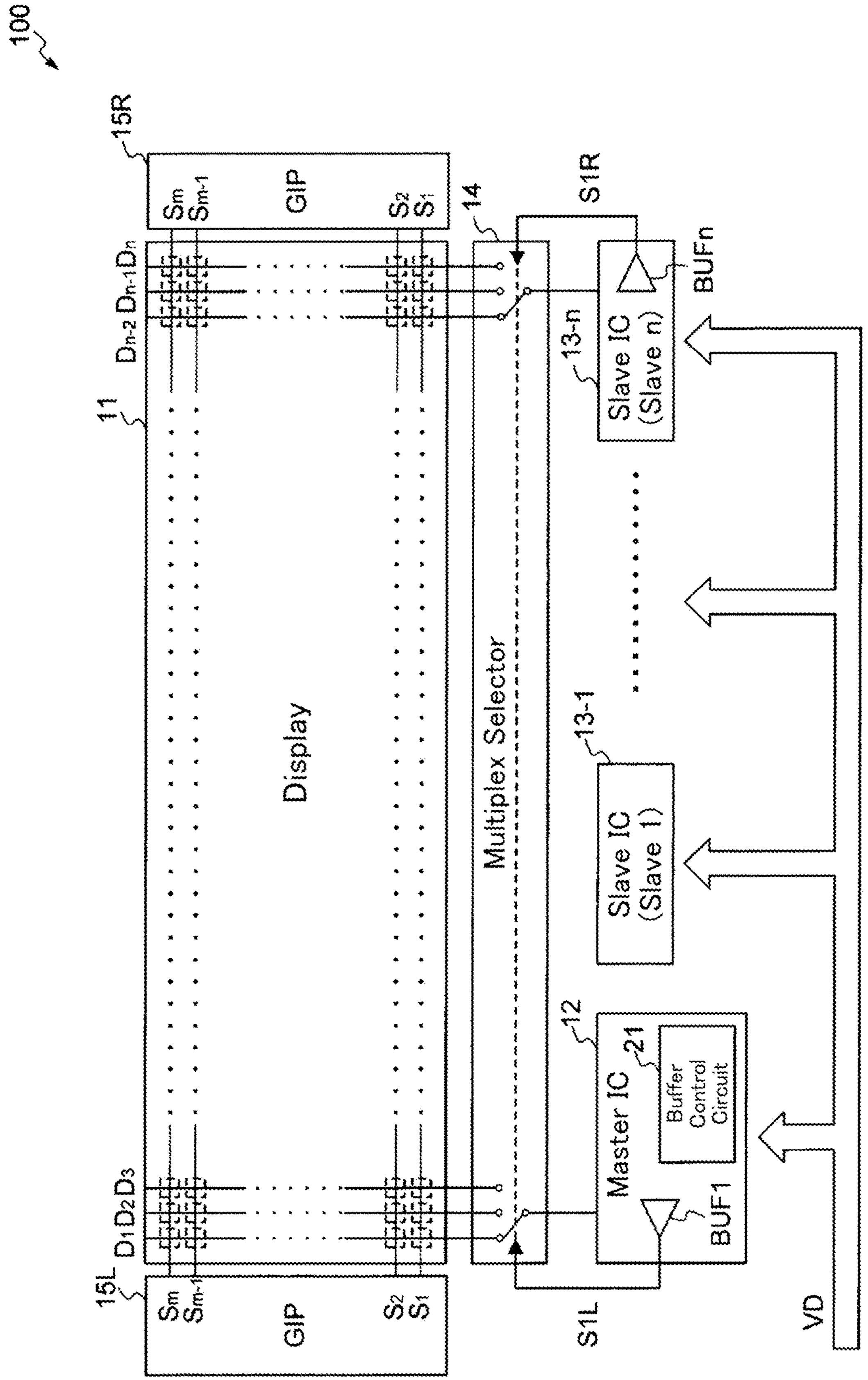
FIG. 1 is a block diagram illustrating a configuration of a display device of Embodiment 1.

Preferred embodiments of the disclosure will be described in detail below. In the descriptions of respective embodiments below and appended diagrams, the same reference characters are given to parts that are substantially the same as each other or equivalent to each other.

According to the display device of the disclosure, it is possible to suppress the generation of through current between respective buffers outputting a select signal for controlling data line switching in the time-division driving.

Embodiment 1

FIG. 1 is a block diagram illustrating a configuration of a display device 100 of Embodiment 1 of the disclosure. The display device 100 includes a display 11, a master IC 12, slave ICs 13-1 to **13-*n* (n is an integer of 2 or greater), a multiplex selector 14, GIPs 15L and 15**R.

The display 11 is constituted of a substrate on which a plurality of pixel sections are arranged in a matrix. The display 11 includes a plurality of gate lines S1 to Sm that are horizontal scanning lines and a plurality of data lines D1 to Dn arranged to intersect with those gate lines. The respective pixel sections are disposed at the intersections of the gate lines S1 to Sm and the data lines D1 to Dn.

The master IC 12 and slave ICs 13-1 to **13-*n* are a group of driver ICs that constitute a source driver. The master IC 12 and slave ICs 13-1 to 13-*n* are arranged along the extending direction of the gate lines S1** to Sm.

Each of the master IC 12 and slave ICs 13-1 to **13-*n* generates a gradation voltage signal to be applied to the pixel sections based on a video signal VD supplied externally. The master IC 12 and the slave ICs 13-1 to 13-*n* output the generated gradation voltage signals to the data lines D1** to Dn. The video signal VD is supplied by data transmission using LVDS (low voltage differential signaling), for example.

The multiplex selector 14 is provided between the display 11 and the master IC 12 and the slave ICs 13-1 to **13-*n*, and supplies the gradation voltage signals outputted from the output amplifiers of the master IC 12 and the slave ICs 13-1 to 13-*n* to a plurality of data lines (in this embodiment, three data lines per output amplifier) while switching target data lines. The multiplex selector 14 performs this switching based on a select signal S1L supplied from the master IC 12 and a select signal S1R supplied from the slave ICs 13-*n*. This way, the time-division driving of the data lines D1** to Dn is performed.

GIPs 15L and 15R are gate drivers mounted on the panel through the GIP (gate in panel) technology. The GIP 15L receives a gate control signal from the master IC 12, and supplies the gate signal to the gate lines S1 to Sm sequentially based on the clock timing included in the gate control signal. The GIP 15R receives a gate control signal from the slave IC **13-*n*, and supplies the gate signal to the gate lines S1** to Sm sequentially based on the clock timing included in the gate control signal.

The master IC 12 and the slave ICs 13-1 to **13-*n* each include a plurality of output amplifiers (not shown) for outputting a gradation voltage signal. In this embodiment, three data lines are connected to each of the output amplifiers, which can be switched so that the time division driving of the data lines is performed according to the switching operation of the multiplex selector 14**.

Of the master IC 12 and slave ICs 13-1 to **13-*n* arranged in the extending direction of the gate lines S1 to Sm, the master IC 12 and the slave ICs 13-*n* located at both ends supply select signals S1L and S1R that control the switching timing of the multiplex selector 14 to the multiplex selector 14**.

The master IC 12 has a buffer BUF1 for outputting the select signal S1L. The slave IC **13-*n*** has a buffer BUFn for outputting the select signal SIR.

The master IC 12 includes a buffer control circuit 21. The buffer control circuit 21 is a voltage control circuit that controls a voltage to be applied to the buffer BUF1.

Figure 2A:
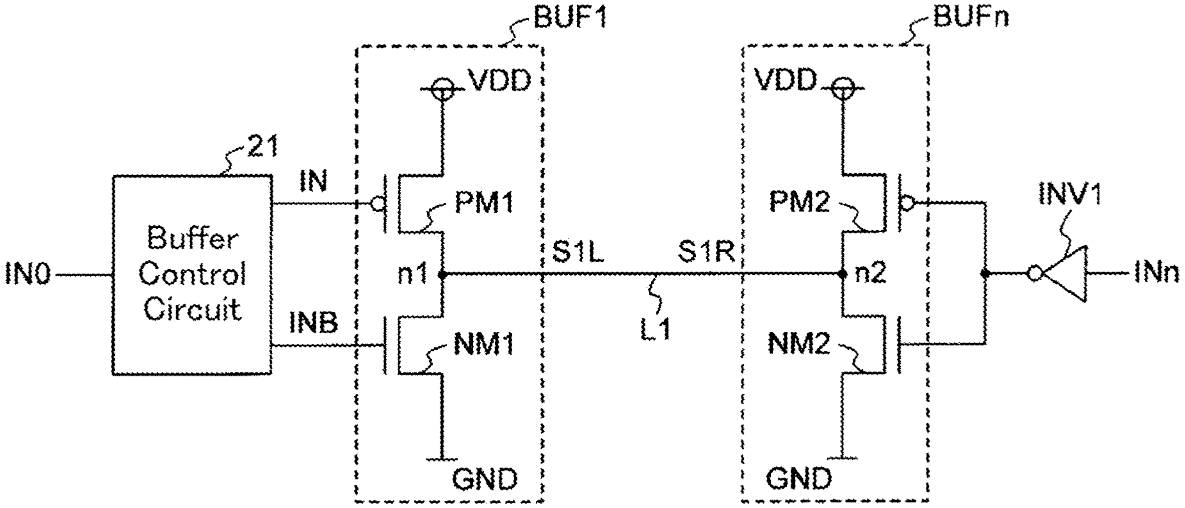
FIG. 2A is a diagram illustrating a configuration of a buffer of each of the driver ICs located at both ends in Embodiment 1.

FIG. 2A is a diagram illustrating the configuration of the buffer BUF1 and BUFn, and the buffer control circuit 21 of this embodiment.

The buffer BUF1 is constituted of transistors PM1 and NM1.

The transistor PM1 is a P-channel type (first conductivity type) MOS transistor (that is, PMOS transistor). The source of the transistor PM1 is connected to the supply line of the power voltage VDD. An input signal IN is supplied to the gate of the transistor PM1.

The transistor NM1 is a N channel type (second conductivity type) MOS transistor (that is, NMOS transistor). The source of the transistor NM1 is grounded (GND). The drains of the transistors PM1 and NM1 are connected to each other through a node n1. An input signal INB is supplied to the gate of the transistor NM1.

The node n1 is a signal output terminal of the buffer BUF1. That is, the select signal S1L is outputted from the node n1 and supplied to the multiplex selector 14.

The buffer control circuit 21 is a control circuit that controls the operation of the buffer BUF1. The buffer control circuit 21 generates the input signal IN to be applied to the gate of the transistor PM1 and the input signal INB to be applied to the gate of the transistor NM1 based on the input signal IN0.

The buffer BUFn is constituted of transistors PM2 and NM2. In this embodiment, the transistors PM1 and NM1 constituting the buffer BUF1 and the transistors PM2 and NM2 constituting the buffer BUFn are the same size (the same gate width and gate length).

The transistor PM2 is a P-channel type (first conductivity type) MOS transistor (that is, PMOS transistor). The source of the transistor PM2 is connected to the supply line of the power voltage VDD.

The transistor NM2 is an N channel type (second conductivity type) MOS transistor (that is, NMOS transistor). The source of the transistor NM2 is grounded. The drains of the transistors PM2 and NM2 are connected to each other through a node n2. The node n2 is a signal output terminal of the buffer BUFn. That is, the select signal S1R is outputted from the node n2 and supplied to the multiplex selector 14.

An inverter INV1 is connected to the respective gates of the transistors PM2 and NM2, and a common input signal INn is applied via the inverter INV1. The transistors PM2 and NM2 are complementarily turned on and off according to the signal level of the input signal INn.

The node n1, which is the signal output terminal of the buffer BUF1, and the node n2, which is the signal output terminal of the buffer BUFn, are short-circuited on the panel constituting the display 11 via the wiring of the multiplex selector 14, for example. In FIG. 2A, the connection part where the node n1 and the node n2 are short-circuited is schematically illustrated as the connection line L1.

Figure 2B:
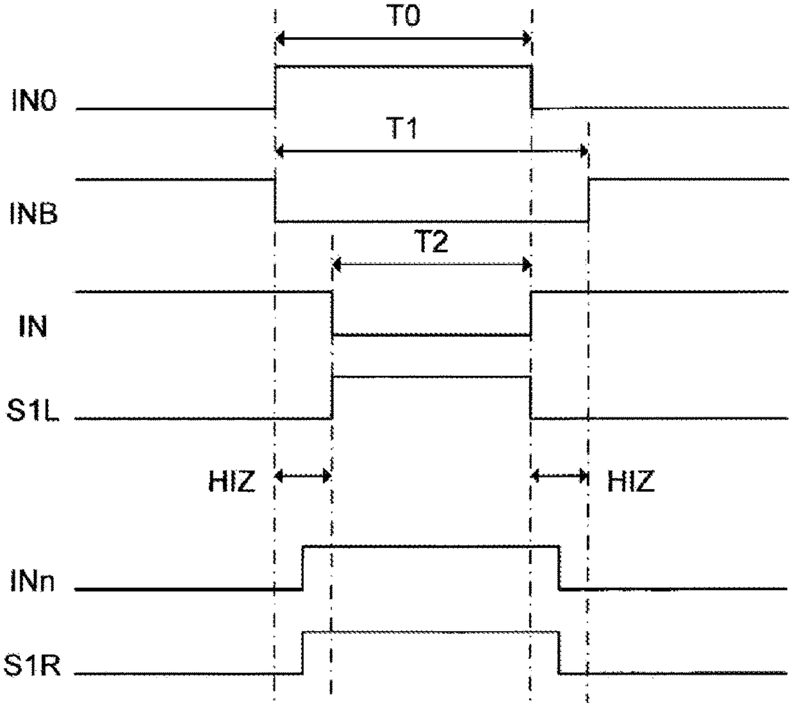
FIG. 2B is a time chart illustrating signal waveforms of input signals of the respective buffers.

FIG. 2B is a time chart illustrating an example of signal waveforms of each signal in the buffers BUF1 and BUFn in this embodiment.

The input signal IN0 is a signal that stays at a logical level 1 (H level) during the period TO. The input signal IN0 is a signal applied to the gates of the transistors PM1 and NM1 when the buffer control circuit 21 as in this embodiment is not provided, and is generated based on the clock signal supplied together with the video signal VD from outside the master IC 12, for example.

The input signal INB drops as the input signal IN0 rises, and rises after the input signal IN0 drops. The input signal INB stays at a logical level 0 during the period T1 that is longer than the period TO. The input signal INB is supplied to the gate of the transistor NM1. While the input signal INB is at the logical level 0 (L level), the transistor NM1 stays off, and while the input signal INB is at the logical level 1, the transistor NM1 stays on.

The input signal IN drops after the input signal IN0 rises, and rises when the input signal IN0 drops. The input signal IN stays at the logical level 0 during the period T2 that is shorter than the period T1. The input signal IN is supplied to the gate of the transistor PM1. While the input signal IN is at the logical level 0, the transistor PM1 stays on, and while the input signal IN is at the logical level 1, the transistor PM1 stays off.

The input signal INB drops before the input signal IN drops, and rises after the input signal IN0 rises. This means that there is a time lag between the signal change timing of the input signal IN and the signal change timing of the input signal INB, which creates a period where the input signal IN is at the logical level 1 while the input signal INB is at the logical level 0.

During this period, the transistors PM1 and NM1 stay off, that is, in a high-impedance state. In the descriptions below, this time period will be referred to as a high impedance period HIZ. In this embodiment, a period between when the input signal IN rises and when the input signal INB rises and a period between the input signal INB drops and the input signal IN drops are the high-impedance period HIZ, respectively.

The input signal INn is a signal applied to the respective gates of the transistors PM2 and NM2 via the inverter INV1, and has a signal waveform similar to that of the input signal IN0. If there was no signal delay or the like of the video signal VD, the input signal INn ideally changes at the same time as the input signal IN0. However, in reality, the signal change timings are affected by the signal delay of the video signal VD, and as a result, the signal change timing of the input signal INn lags behind the signal change timing of the input signal IN0.

While the input signal INn is at the logical level 1, the gate of the transistor PM2 and the gate of the transistor NM2 are applied with a signal of the logical level 0 via the inverter INV1. This turns the transistor PM2 on and the transistor NM2 off. While the input signal INn is at the logical level 0, the gate of the transistor PM2 and the gate of the transistor NM2 have applied thereto a signal of the logical level 1 via the inverter INV1. This turns the transistor PM2 off and the transistor NM2 on.

In this embodiment, the buffer control circuit 21 controls the input signal IN applied to the gate of the transistor PM1 and the input signal INB applied to the gate of the transistor NM1 separately, creating the high-impedance period HIZ in which both the transistors PM1 and NM1 are off. This makes it possible to suppress the generation of through current between respective buffers. This will be further explained below with reference to FIGS. 3A and 3B.

Figure 3A:
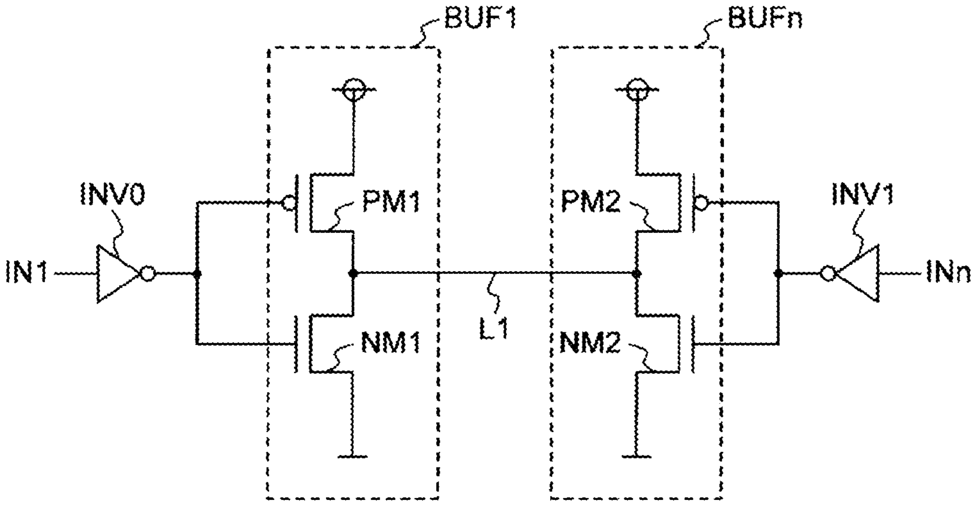
FIG. 3A is a diagram illustrating a configuration of a buffer of a comparison example that is not provided with a buffer control circuit.

FIG. 3A is a diagram illustrating a configuration of a buffer of a comparison example that does not have the buffer control circuit of this embodiment.

The inverter INV0 is connected to the respective gates of the transistors PM1 and NM1, and a common input signal IN1 is applied via the inverter INV0. Thus, the transistors PM1 and NM1 are complementarily turned on and off according to the signal level of an inverted signal of the input signal IN1.

Figure 3B:
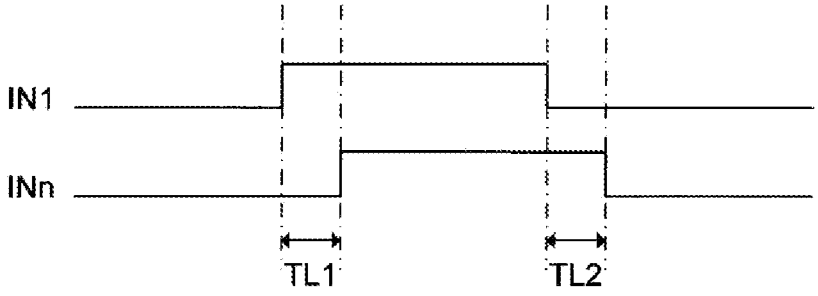
FIG. 3B is a time chart showing signal waveforms of the comparison example that is not provided with a buffer control circuit.

FIG. 3B is a diagram illustrating the signal waveforms of the input signals IN1 and INn in the comparison example of FIG. 3A.

The input signal INn changes at the same time as the input signal IN0 in an ideal situation. However, in reality, signal delay of the video signal VD, wiring delay, and the like creates time lags TL1 and TL2 between the signal change timing of the input signal IN1 and the signal change timing of the input signal INn.

During the period with the time lag TL1, because the input signal IN1 is at the H level, the gate of the transistor PM1 and the gate of the transistor NM1 of the buffer BUF1 are applied with a L-level signal via the inverter INV1. This turns the transistor PM1 on and the transistor NM1 off. On the other hand, because the input signal INn is at the L-level, the gate of the transistor PM2 and the gate of the transistor NM2 of the buffer BUFn have applied thereto an H-level signal via the inverter INV1. This turns the transistor PM2 off and the transistor NM2 on. As a result, a current that flows from the transistor PM1 to the transistor NM2 through the connection line L1 (through current) is generated. This generation of through current potentially causes a problem of producing EMI (electromagnetic interference) noise in a display device.

During the period with the time lag TL2, because the input signal IN1 is at the L level, the gate of the transistor PM1 and the gate of the transistor NM1 of the buffer BUF1 have applied thereto an H-level signal via the inverter INV0. This turns the transistor PM1 off and the transistor NM1 on. On the other hand, because the input signal INn is at the H-level, the gate of the transistor PM2 and the gate of the transistor NM2 of the buffer BUFn have applied thereto an L-level signal via the inverter INV1. This turns the transistor PM2 on and the transistor NM2 off. As a result, a current that flows from the transistor PM2 to the transistor NM1 through the connection line L1 (through current) is generated.

Returning to FIGS. 2A and 2B, the buffer control circuit 21 of this embodiment controls the input signal IN applied to the transistor PM1 and the input signal INB applied to the transistor NM1 separately, creating the high-impedance period HIZ in which both the transistors PM1 and NM1 are off. The high-impedance period HIZ is set to be sufficiently long considering that the input signal INn, which is the input signal of the buffer BUFn, lags behind the input signal IN0. Thus, the input signal INn changes (rises and drops) within the high impedance period HIZ.

During the high-impedance period HIZ, the transistors PM1 and NM1 are both turned off, and therefore, unlike the comparison example, there is no period in which the transistors PM1 and NM2 are on at the same time, or there is no period in which the transistors PM2 and NM1 are on at the same time.

As described above, with the buffer control circuit 21 of this embodiment that controls the ON and OFF timings of the transistors PM1 and NM1 to create the high-impedance period HIZ in which both of the transistors PM1 and NM1 are turned off, the generation of through current between the buffers is suppressed. This makes the EMI noise, which is caused by the through current, less likely to be generated as well.

Embodiment 2

Next, Embodiment 2 of the disclosure will be explained.

Figure 4:
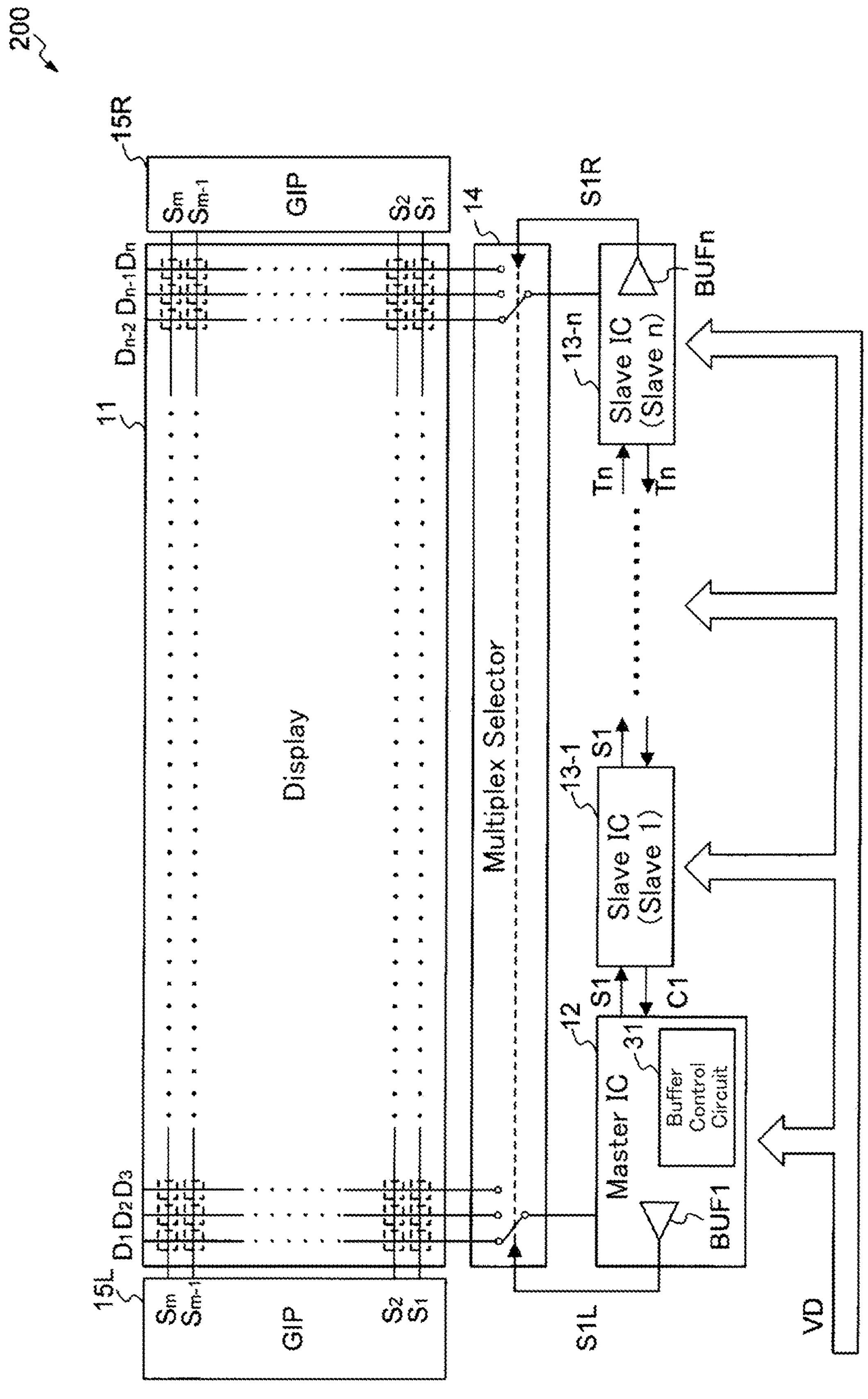
FIG. 4 is a block diagram illustrating a configuration of a display device of Embodiment 2.

FIG. 4 is a block diagram illustrating a configuration of a display device 200 of Embodiment 2 of the disclosure. The display device 200 includes a display 11, a master IC 12, slave ICs 13-1 to 13-*n*, a multiplex selector 14, GIPs 15L and 15R.

In this embodiment, of the plurality of source driver ICs constituting the master IC 12 and the slave ICs 13-1 to 13-*n*, adjacent ICs are cascade-connected, respectively.

The master IC 12 supplies the first cascade signal S1 to the slave IC 13-1, which is the adjacent source driver IC. The slave IC 13-1 supplies this first cascade signal S1 to the slave IC 13-2. Subsequently, the slave ICs 13-2 to 13-(*n*−1) receive the first cascade signal S1 from the previous driver IC (the driver IC to the left on the drawing), and supply this signal to the next driver IC (the driver IC to the right on the drawing), respectively.

The rightmost slave IC 13-*n* receives a cascade signal Tn, which is the first cascade signal S1 being delayed by going through a plurality of source driver ICs sequentially. The slave IC 13-*n* supplies the cascade signal Tn to the transistors PM2 and NM2 of the buffer BUFn as the input signal INn. Also, the slave IC 13-*n* supplies the cascade signal Tn back to the slave IC 13-(*n*−1). The cascade signal Tn is sequentially supplied back to the slave IC 13-(*n*−1), 13-(*n*−2), . . . , and reaches the master IC 12 as a second cascade signal C1.

Figure 5A:
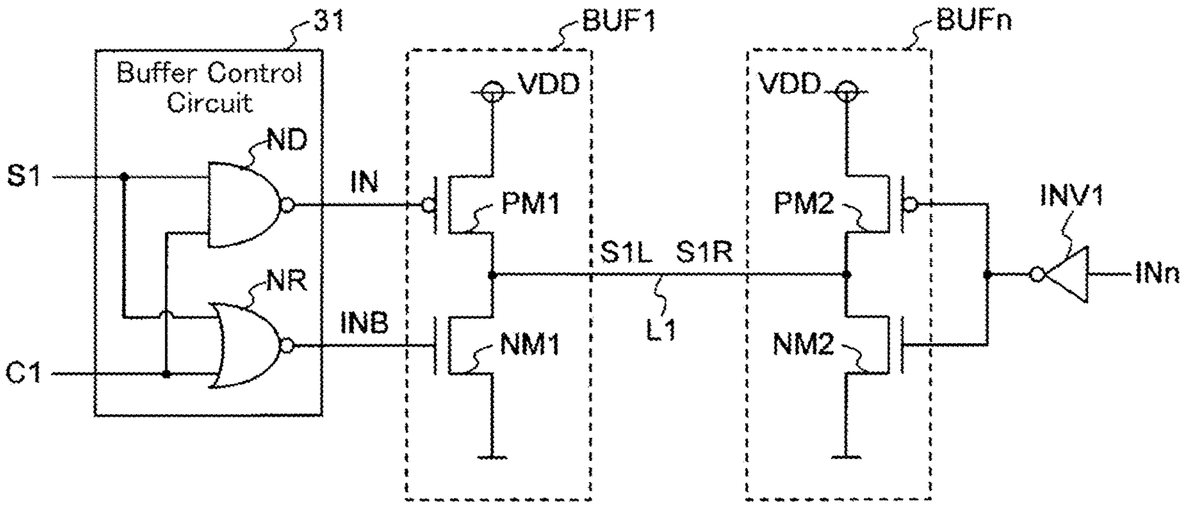
FIG. 5A is a diagram illustrating a configuration of a buffer of each of the driver ICs located at both ends in Embodiment 2.

FIG. 5A is a diagram illustrating the configuration of the buffer BUF1, the buffer BUFn, and the buffer control circuit 31 of Embodiment 2.

The buffer control circuit 31 is constituted of a NAND circuit ND and a NOR circuit NR. The first cascade signal S1 is supplied to the first input terminal of the NAND circuit ND. The second cascade signal C1 is supplied to the second input terminal of the NAND circuit ND.

The NAND circuit ND outputs NAND of the first cascade signal S1 and the second cascade signal C1 from an output terminal, which is then supplied to the gate of the transistor PM1 of the buffer BUF1 as the input signal IN.

The second cascade signal C1 is supplied to the first input terminal of the NOR circuit NR. The first cascade signal S1 is supplied to the second input terminal of the NOR circuit NR. The NOR circuit NR outputs NOR of the first cascade signal S1 and the second cascade signal C1 from an output terminal, which is then supplied to the gate of the transistor NM1 of the buffer BUF1 as the input signal INB.

Figure 5B:
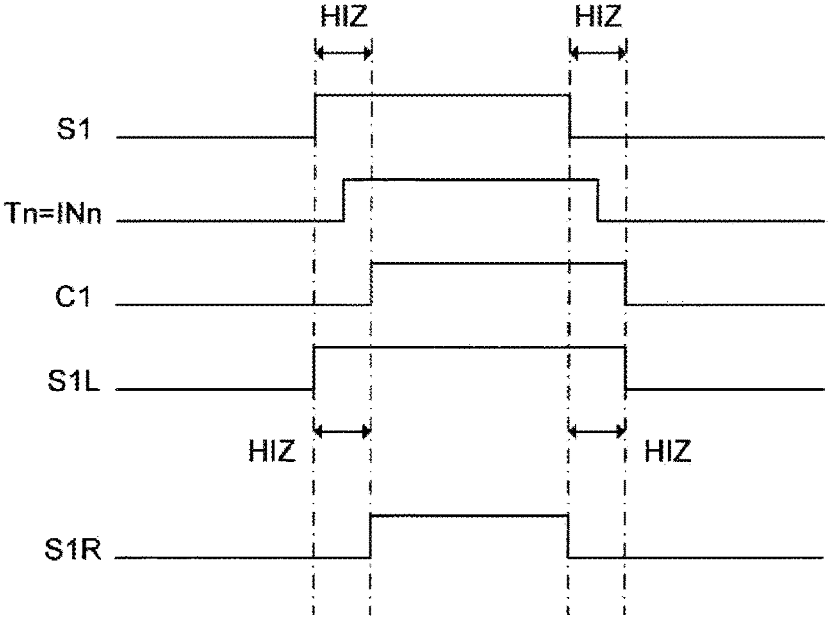
FIG. 5B is a time chart illustrating signal waveforms of input signals of the respective buffers.

FIG. 5B is a time chart illustrating an example of signal waveforms of each signal in the buffers BUF1 and BUFn of this embodiment.

The cascade signal Tn is the first cascade signal S1 outputted from the master IC 12, sequentially shifted through a plurality of source driver ICs, and then supplied to the slave IC 13-*n*. Therefore, the cascade signal Tn is a signal obtained by delaying the first cascade signal S1 by a prescribed period, and has a signal waveform obtained by shifting the first cascade signal S1 along the axis representing time.

The second cascade signal C1 is the cascade signal Tn sent back by the slave IC 13-*n*, sequentially shifted through the plurality of source driver ICs, and then supplied to the master IC 12. Therefore, the second cascade signal C1 is a signal obtained by delaying the first cascade signal S1 by a prescribed period, and has a signal waveform obtained by shifting the first cascade signal S1 along the axis representing time.

The time lag between the first cascade signal S1 and the second cascade signal C1 creates a high-impedance period HIZ in the buffer BUF1. As described above, the cascade signal Tn is a signal that changes later than the first cascade signal S1 and earlier than the second cascade signal C1. Also, the cascade signal Tn is the input signal INn supplied to the transistors PM2 and NM2 of the buffer BUFn.

Thus, because the signal change of the input signal INn occurs within the high-impedance period HIZ of the buffer BUF1, the transistors PM2 and NM2 of the buffer BUFn are always turned on and off within the high-impedance period HIZ of the buffer BUF1. This means that there is no period in which the transistors PM1 and NM2 are on at the same time, or there is no period in which the transistors PM2 and NM1 are on at the same time.

As described above, with the buffer control circuit 31 that creates a high-impedance period HIZ in which both of the transistors PM1 and NM1 are turned off, it is possible to suppress the generation of through current between the buffers as in Embodiment 1. This makes the EMI noise, which is caused by the through current, less likely to be generated as well.

In addition, in the configuration of this embodiment, the signal change of the input signal INn supplied to the transistors PM2 and NM2 constituting the buffer BUFn occurs later than the first cascade signal S1 and earlier than the second cascade signal C1. This means that the operation timing of the buffer BUFn, or in other words, the timing at which the transistors PM2 and NM2 are turned on and off, always coincides with the high-impedance period HIZ of the buffer BUF1. Thus, the configuration of this embodiment can suppress the generation of through current more reliably.

The disclosure is not limited to the embodiments described above. For example, in Embodiment 1 above, an example in which the master IC 12 includes the buffer control circuit 21 or 31 was described. However, it is also possible to install the buffer control circuit 21 or 31 in the slave IC 13-*n* so that the high-impedance period is created in the buffer BUFn of the slave IC 13-*n*.

Further, in Embodiment 1 and Embodiment 2 described above, an example was explained, aiming at suppressing through current between the output buffers of the master IC 12 and the slave IC 13-*n* that are located at both ends of the plurality of driver ICs arranged along the extending direction of the gate lines S1 to Sm. However, the disclosure may aim at suppressing a through current between other driver ICs than the driver ICs located at both ends. For example, the select signal for performing the time division driving on the multiplex selector 14 may be outputted from another driver IC located between the master IC 12 and the slave IC 13-*n*, such as the k-th slave IC 13-*k* (k is at least 1 and less than n). In this configuration, by controlling the voltage applied to the buffers in the master IC 12, through current between the buffers of the master IC 12 and slave IC 13-*k* can be suppressed.

In Embodiment 2 described above, an example was explained in which the buffer control circuit 31 is constituted of a NAND circuit ND and a NOR circuit NR. However, the configuration of the buffer control circuit is not limited to this, and any configuration may be adopted as long as the high-impedance period HIZ of the buffer BUF1 can be generated using the first cascade signal S1 and second cascade signal C1.

In Embodiment 1 described above, an example was explained in which the number of slave ICs is 2 or greater. However, the number of slave ICs may be one. In this case, the slave IC 13-1 outputs the select signal SIR, and therefore, the buffer control circuit 21 controls the operation of the buffer BUF1 such that the generation of through current between the buffer BUF1 and the output buffer in the slave IC 13-1 is suppressed.

What is claimed is:

1. A display device, comprising:

a display having a plurality of data lines and a plurality of gate lines, and a plurality of pixel sections disposed at respective intersections of the plurality of data lines and the plurality of gate lines in a matrix;

an n-number of source driver ICs (n is an integer of 2 or greater) each outputting a gradation voltage signal to two or more data lines, out of the plurality of data lines based on a video data signal; and a selector that receives a switching signal and supplies the gradation voltage signal outputted from each of the n-number of source driver ICs to the two or more data lines selectively based on the switching signal, wherein the n-number of source driver ICs include a first source driver IC that has a first output buffer outputting the switching signal and a n-th source driver IC that has a second output buffer outputting the switching signal, wherein the first output buffer includes a first transistor and a second transistor that are connected in parallel via a first node that is an output terminal outputting the switching signal, the first and second transistors being turned on and off by receiving a voltage at respective control terminals thereof, wherein the second output buffer includes a third transistor and a fourth transistor that are connected in parallel via a second node that is an output terminal outputting the switching signal, the third and fourth transistors being turned on and off in a complementary manner by receiving a voltage at respective control terminals thereof, wherein the first node and the second node are electrically connected to each other, and wherein the first source driver IC includes a buffer control circuit that controls a voltage applied to the control terminals of the first transistor and the second transistor in order to create a high impedance period in which the first transistor and the second transistor are turned off at a same time, and wherein the buffer control circuit performs controls such that the first transistor remains off during a first period and the second transistor remains on during a second period that starts later than the first period and ends earlier than the first period.

2. The display device according to claim 1, wherein n is an integer of 3 or greater, wherein the n-number of source driver ICs are constituted of first to n-th source driver ICs arranged along one direction and respectively cascade-connected to adjacent source driver ICs, wherein the first source driver IC receives a second cascade signal that is a first cascade signal supplied to a second source driver IC, the first cascade signal going in the one direction through a plurality of source driver ICs from the second source driver IC to the n-th source driver IC sequentially and being sent back to the first source driver IC by the n-th source driver IC by going through the plurality of source driver ICs in a reverse direction opposite to the one direction toward the first source driver IC sequentially, and wherein the buffer control circuit controls a voltage applied to the control terminals of the first transistor and the second transistor based on the first cascade signal and the second cascade signal.

3. The display device according to claim 2, wherein the buffer control circuit includes a NAND circuit that outputs NAND of the first cascade signal and the second cascade signal as a control signal for the first transistor, and an NOR circuit that outputs NOR of the first cascade signal and the second cascade signal as a control signal for the second transistor.

4. A source driver connected to a display panel having a plurality of data lines, a plurality of gate lines, and a plurality of pixel parts disposed at respective intersections of the plurality of data lines and the plurality of gate lines in a matrix, the source driver outputting a gradation voltage based on a video data signal, the source driver comprising:

an n-number of driver ICs (n is an integer of 2 or greater) connected to a selector that selectively supplies the gradation voltage signal outputted from the source driver to two or more data lines of the plurality of data lines based on a switching signal, wherein the n-number of driver ICs include a first driver IC that has a first output buffer outputting the switching signal and a n-th driver IC that has a second output buffer outputting the switching signal, wherein the first output buffer includes a first transistor and a second transistor that are connected in parallel via a first node that is an output terminal outputting the switching signal, the first and second transistors being turned on and off by receiving a voltage at respective control terminals thereof, wherein the second output buffer includes a third transistor and a fourth transistor that are connected in parallel via a second node that is an output terminal outputting the switching signal, the third and fourth transistors being turned on and off in a complementary manner by receiving a voltage at respective control terminals thereof, wherein the first node and the second node are electrically connected to each other, wherein the first driver IC includes a control circuit that controls a voltage applied to the control terminals of the first transistor and the second transistor in order to create a high impedance period in which the first transistor and the second transistor are turned off at a same time, and wherein the buffer control circuit performs controls such that the first transistor remains off during a first period and the second transistor remains on during a second period that starts later than the first period and ends earlier than the first period.

* * * * *